United States Patent [19]
Halen, Jr.

[11] Patent Number: 5,842,726
[45] Date of Patent: Dec. 1, 1998

[54] PREFORMED TRANSITION PIPE COUPLING

[75] Inventor: Richard M. Halen, Jr., Pittsburgh, Pa.

[73] Assignee: Smith-Blair, Inc., Texarkana, Tex.

[21] Appl. No.: 607,659

[22] Filed: Feb. 27, 1996

[51] Int. Cl.[6] ........................................... F16L 55/00
[52] U.S. Cl. ............. 285/148.13; 285/256; 285/342; 285/382
[58] Field of Search ..................... 285/175, 337, 285/239, 255, 256, 174, 906, 148.13, 148.16, 342, 343, 382, 382.4, 382.7

[56] References Cited

U.S. PATENT DOCUMENTS

| | | |
|---|---|---|
| 2,013,217 | 9/1935 | Olmstead . |
| 3,287,802 | 11/1966 | Robinson et al. . |
| 3,429,587 | 2/1969 | Kish . |
| 3,656,783 | 4/1972 | Reeder . |
| 3,915,480 | 10/1975 | Kish et al. . |
| 4,062,572 | 12/1977 | Davis . |
| 4,094,537 | 6/1978 | Lyall . |
| 4,136,897 | 1/1979 | Haluch . |
| 4,293,147 | 10/1981 | Metcalfe et al. . |
| 4,295,668 | 10/1981 | Louthan et al. ............ 285/174 X |
| 4,466,640 | 8/1984 | Van Houtte . |
| 4,482,170 | 11/1984 | Jacobson et al. . |
| 4,569,542 | 2/1986 | Anderson et al. . |
| 4,679,830 | 7/1987 | Kok ........................... 285/906 X |
| 4,793,638 | 12/1988 | Baldwin, Jr. . |
| 4,997,214 | 3/1991 | Reese . |
| 5,069,490 | 12/1991 | Halen, Jr. . |
| 5,100,183 | 3/1992 | Montesi et al. . |

Primary Examiner—Terry Lee Melius
Assistant Examiner—Heather Shackelford

[57] ABSTRACT

A preformed transition pipe coupling is disclosed for the joining together of a generally cylindrical plastic pipe end to a generally cylindrical metal pipe end. A middle ring is provided and a first end of a length of plastic pipe is inserted into and permanently joined to the first end of the middle ring at the factory. Preferably, the length of plastic pipe is joined by securing the plastic pipe to the middle ring by compressing the plastic pipe end between the middle ring and a compression member and securing it in place by utilizing metal teeth and grooves adjacent the inner periphery or outer periphery surface of the plastic pipe. The second end of a joined plastic length of pipe is heat fused to a plastic pipe in the field. A field installed mechanical coupling is attached to a second end of the middle ring to allow for field connection of the coupling to a metal pipe without welding. The coupling includes a follower movable relative to the middle ring which, when tightened, compresses a gasket to provide a seal and collapses a lock ring onto the metal pipe to grip the surface of the pipe. A control is provided to ensure an adequate seal and an adequate grip even when installed on an anchored metal pipe.

11 Claims, 9 Drawing Sheets

PREFORMED TRANSITION PIPE COUPLING

BACKGROUND OF THE INVENTION

1. Field of the Invention

This invention relates to an improved pipe coupling for the joining together of plastic (or other non-metallic pipe material) and metal pipe ends. More specifically, it relates to a pipe coupling which has a plastic pipe segment inserted into and permanently affixed at the factory to one end of the coupling with a mechanical pipe coupling provided at the other end to join the metal pipe end.

2. Description of the Art

In the field of pipe joining, there are particular situations in which a metallic pipe (such as steel) must be connected to a nonmetallic pipe (such as plastic). Such connections between dissimilar materials are commonly referred to as transitions. Presently there are two primary methods of making such transition connections.

The first such method employs a universal mechanical pipe coupling. It is critical for safety that such mechanical devices provide both a gas-tight seal and a restraining lock on the pipe ends which are connected. U.S. Pat. No. 5,069,490 (Halen) and U.S. Pat. No. 4,569,542 (Anderson et al.) are two examples of mechanical couplings which satisfy the transition connection requirements.

Though proven to be effective for such connections, mechanical couplings, when used on plastic pipe, require critical care by the installer to ensure that the plastic pipe inner diameter (ID) is properly supported and that the coupling be fully and completely tightened. Variations in either the ID support or the bolt torque may adversely affect the ability of such fittings to retain long-term performance. Thus, the installer becomes a critical parameter in long-term operation of the joint.

An alternative method, favored by some pipeline operators, uses a factory-made transition device such as that described by U.S. Pat. No. 3,656,783 (Reeder) and U.S. Pat. No. 4,293,147 (Metcalfe et al.). Such devices feature a short segment of a metallic pipe and a short segment of plastic pipe joined by one of several mechanical methods. Because the metal to plastic transition is prepared under carefully controlled factory conditions, the joint is made correctly and dependably without concern for "operator error".

Such transition fittings are used in the field for metal to plastic connections by aligning the fitting so that the plastic end meets the plastic pipe end and the metallic end meets the metallic pipe end. The operator then makes two connections in the field, namely, a plastic to plastic and a metal to metal. The plastic to plastic connection requires use of various heat fusion methods and the metal to metal connection is made by either welding or by one of many available metal to metal connection devices.

Ironically, the mechanical coupling such as described in U.S. Pat. No. 5,069,490 is often used to make the steel to steel connection in conjunction with a factory made transition fitting.

While the existing mechanical coupling methods are relatively simple and economical and have proven to be reliable, there exists the chance that operator error could adversely affect joint performance. Alternatively, while the factory-made transition fitting allays concern for field joining plastic pipe, such method requires additional and expensive connection means.

There remains, therefore, a need for a device which marries the security of a factory-made transition with the simplicity of a mechanical coupling.

SUMMARY OF THE INVENTION

The present invention provides a pipe coupling for the joining together of two pipe ends of dissimilar materials. The coupling provides a seal against internal pressure and a restraint against longitudinal movement of the pipes.

By combining the two technologies described above into a single coupling, all of the advantages of these methods are combined and the disadvantages of each are eliminated. A complete description of this invention follows.

In its most basic form, the present invention provides a preformed transition pipe coupling suitable for joining a generally cylindrical plastic pipe end and a generally cylindrical metal pipe end. A metal middle ring having a first end and a second end is provided and a first segment end of the plastic pipe segment is inserted into and permanently affixed to said first end of said middle ring at the factory. This is accomplished by a joining means which imposes an axial restraint on said first plastic pipe segment end, said plastic pipe segment having a said second plastic pipe end extending axially out of the coupling. The joining means also provides an adequate gas pressure seal between the plastic pipe segment and the middle ring.

A metal pipe coupling means is provided for coupling the metal pipe end to said second end of said middle ring. The metal pipe coupling includes a follower means adapted to move relative to said middle ring during installation to activate the sealing and gripping functions of the coupling; gasket means to provide an adequate gas pressure seal between said second end of said middle ring and said metal pipe end when said follower is moved relatively closer to said middle ring; locking means effective when collapsed to grip the surface of the received metal pipe end for imposing an axial restraint thereon when said follower is moved relative to said middle ring; control means effective during said motion of the follower to provide an adequate gas pressure seal between said second end of said middle ring and said metal pipe end prior to completed collapse of said locking means; and tightening means to move said follower relative to said middle ring.

The joining means operates to permanently affix the first segment end of said plastic pipe segment to said first end of said middle ring by either deforming the first segment end of the plastic pipe segment onto a plurality of metal teeth and grooves or by deforming a plurality of metal teeth into the first segment end of said plastic pipe segment.

In one embodiment, the joining means further comprises the provision of a plurality of teeth and grooves adjacent the inner diameter surface of said first end of the middle ring and wherein said first plastic pipe segment end has an engaging surface thereon defined as one of outer periphery surface and further has a non-engaging surface defined as the inner periphery surface, said engaging surface placed in engagement with said teeth and grooves, with a compression member sized and adapted to slide adjacent to and contact the non-engaging surface to compress and to cold form the plastic material at the location of the engaging surface of the first segment end of the plastic pipe segment onto and into said teeth and grooves.

In another embodiment, the joining means further comprises the provision of a plurality of teeth and grooves adjacent the outer diameter surface of said first end of the middle ring and wherein said first plastic pipe segment end has an engaging surface thereon defined as the inner periphery surface and further has a non-engaging surface defined as the outer periphery surface, said engaging surface placed in engagement with said teeth and grooves, with a compression member sized and adapted to slide adjacent to and contact the non-engaging surface to compress and to cold form the plastic material at the location of the engaging surface of the first segment end of the plastic pipe segment onto and into said teeth and grooves.

In one embodiment, the joining means further comprises the provision of teeth and grooves on an outer peripheral surface of a compression member which is inserted inside the first segment end of the plastic pipe segment from the second end of the middle ring to engage and secure the first segment end of said length plastic pipe segment, and wherein said compression means includes a flange to prevent retraction of the compression member from the first end of the middle ring.

Preferably, the joining means further comprises elastomeric sealing means to aid in creating an adequate pressure seal between said first end of said middle ring and said first end of said length of plastic pipe. In a preferred embodiment the elastomeric sealing means includes at least one O-ring member positioned in a groove provided in said first end of said middle ring.

As is apparent from the foregoing, the joining means of the present invention may have a number of particular structural forms. Some of the various forms which the joining means may take are set forth in the disclosures of:

U.S. Pat. No. 3,656,783 (Reeder);

U.S. Pat. No. 4,293,147 (Metcalfe et al.) and

U.S. Pat. No. 4,997,214 (Reese).

The disclosures of each of these U.S. patents are hereby incorporated herein by reference.

The particular structures shown in FIGS. 1 and 5 of Reeder; FIG. 5 of Metcalfe et al.; and FIGS. 1 and 7 of Reese will each perform the joining means contemplated by the present invention.

In each of these embodiments, the first end of the middle ring would have to be sized and adapted to cooperate with the other components shown and described in such patents. For example, to accommodate the Reese design, the first end of the middle ring would have the same configuration as the left side of metal sleeve 12 as shown in FIG. 1 of Reese. To accommodate the Metcalfe et al. design, the metal insert 16 as shown in FIG. 5 of Metcalfe et al. would be attached to or formed to be the first end of the middle ring of the present invention. Similarly, to accommodate the Reeder design, pipe coupling member 10 as shown in FIG. 1 of Reeder would be welded to or otherwise formed to be the first end of the middle ring of the present invention, rather than be welded to the metal pipe 12 as therein shown.

In the mechanical coupling provided at the second end of the middle ring, the control means may provide an initial predetermined clearance between the gasket means and the locking means in a manner whereby initial tightening of said tightening means will cause adequate deformation of said gasket means to create an adequate pressure seal prior to completed collapse of said locking means. A large number of existing coupling structures are known which will perform such a control means function at this end of the improved coupling. Some of the various forms of the structures which operate in this manner are set forth in the disclosures of:

U.S. Pat. No. 5,069,490 (Halen);

U.S. Pat. No. 4,569,542 (Anderson et al.);

U.S. Pat. No. 5,100,183 (Montesi et al.);

U.S. Pat. No. 3,915,480 (Kish et al);

The disclosures of each of these U.S. patents are hereby incorporated herein by reference.

The structure of Halen, U.S. Pat. No. 5,069,490, is the presently preferred embodiment for the mechanical coupling end of the present invention and this structure will be further addressed in the detailed description of the preferred embodiment. In short, Halen utilizes an independent metal wave spring as the control means to create an initial predetermined clearance between the lock ring and the gasket to perform the control means function.

Anderson et al., U.S. Pat. No. 4,569,542, discloses a pipe coupling which, among other things, teaches the provision of a control means including an axial extending central recess in the surface of the gasket 24 facing a lock ring 28 and having an annular rib 40 extending axially rearward and positioned to make contact with the follower 30 before collapse of said lock ring is initiated. The recess defines an initial predetermined clearance between said gasket and said lock ring. Thus, in Anderson et al. the control means is created by the gasket rib and recess rather than by the independent metal wave spring as in Halen. FIG. 3 of Anderson et al. best shows this structure. As is more fully described hereinafter with the Halen design, Anderson et al. would be modified by welding flange 30 (or an equivalent flange) to the middle ring of the present invention and utilizing only the right side of the Anderson et al. coupling as shown in FIG. 2 of Anderson et al.

Montesi et al., U.S. Pat. No. 5,100,183, discloses a pipe coupling which provides a similar type of control means but rather than utilize a spring or a gasket rib to create a predetermined clearance, Montesi et al. utilizes a radial shoulder 50 formed onto follower 44 to provide a controlled space Y between the rear face of gasket 64 and the backup ring 66 and gripper ring 68. FIGS. 3 and 4 of Montesi et al. disclose this structure. Again, with the Montesi et al. design one flange would be welded to the middle ring of the present invention and only the remaining components shown on the right sides of FIG. 3 of Montesi et al. would be utilized.

Kish et al., U. S. Pat. No. 3,915,480, discloses a pipe coupling having a tubular shell 11, annular gaskets 15 and 16 and gripping rollers 51. Kish et al. specifically teaches that for use with the first coupling embodiment, an annular recess 53 is provided on the gasket periphery to insure that elastomeric sealing is obtained before contact is made between the roller (lock ring) and adjacent walls of the coupling and pipe. (Col. 6, lines 9–14). The device described by Kish et al. provides two gasket rib portions which create a recess and clearance between the gripper and the pipe. In Kish et al., the gasket ribs extend radially rather than axially as in Anderson et al. The gasket ribs of the Kish et al. device provide clearance to assure that upon initial activation of the tightening means (fluid pressure), the ribs and the gasket are properly compressed prior to obtaining a grip by the gripping roller. The right side of FIG. 1 of Kish et al. best discloses this structure and the second end of the middle ring of the present invention would be formed to have such a structure. In Kish et al., the deformable arch 12 acts as the follower and moves radially inward relative to middle ring 17 to activate the coupling's sealing and gripping functions.

Alternatively, the control means may provide an initial pre-determined clearance between the follower means and the locking means in a manner whereby initial tightening of said tightening means will cause adequate deformation of said gasket means to create an adequate pressure gas seal prior to completed collapse of said locking means.

An example of this type of control means is described in Haluch, U.S. Pat. No. 4,136,897, the disclosure of which is also incorporated herein by reference. Haluch discloses a pipe coupling which includes, among other things, a body 22, an annular seal (gasket) 50, a sleeve (lock ring) 30 and a nut (follower) 12. Haluch teaches that prior to the contact of the sleeve (lock ring) and body, the seal (gasket) 50 engages a beveled edge 64 which deforms and compresses the seal (gasket) to prevent leakage between the tublar member (pipe 26) and the body. Further engagement of the nut (follower) and body after the sleeve (lock ring) contacts the body moves the inturned flange relative to the sleeve (lock ring) such that the frustoconical surface 20 on the inturned nut (follower) engages the tapered surface 40 on the sleeve (lock ring) and slides toward the body thereby radially contracting the sleeve (lock ring) over the tubular member (pipe) and urging the helical grooves into engagement with the tubular member (pipe). (Col. 2, line 58—Col 3, line 7). Thus, Haluch teaches control means 50 (again, the use of a gasket rib and recess) effective in the course of the bolt and nut means being tightened to achieve a predetermined level of gasket deformation prior to effecting completed collapse of said lock ring. The recess defines an initial pre-determined clearance between the follower and the lock ring rather than between the gasket and lock ring as in Halen and Anderson.

As with the other embodiments, the middle ring of the present invention would have to be adapted to receive the coupling of Haluch. In this example, the second end of the A third type of control means which is contemplated by the present invention operates by allowing the gripping functions and sealing functions to occur independently of one another so that the completed collapse of the lock ring on the metal pipe end will not prevent an adequate seal from being formed.

A first example of this kind of a control means is found in an existing product marketed as Coupling Systems, Inc.'s U-Series pipe couplings. FIG. 1 (prior art) illustrates the structure of a typical U-Series coupling. The coupling, as shown (and as actually manufactured, sold and used), is asymmetric. The left side includes both a gripping member 2a and a sealing member 3a compressed by a single follower 11 whereas the right side includes a separate gripping member 2b and a sealing member 3b which are activated independently by first tightening nut 41 to move flange 21 relatively closer to flange 11 thereby compressing both gaskets 3a and 3b and collapsing lock ring 2a onto the plastic pipe 50 but not collapsing lock ring 2b onto the steel pipe 60. Tightening nuts 41 creates an adequate seal at both ends of the coupling with gasket 3a creating the seal between the plastic pipe 50 and the middle ring 1 and gasket 3b creating the seal between the steel pipe 60 and the middle ring 1. As used in this application, the term "adequate seal" shall mean a seal at least as great as is required to hold the amount of pressure for which the coupling is rated. This is possible even when the steel pipe 60 is restrained from axial movement because even after lock ring 2a engages the outer surface of plastic pipe 50, flange 21 and the middle ring 1 can be still be moved relatively closer to the now locked flange 11 thereby allowing for further compression of both gaskets 3a and 3b. Subsequently, nut 42 is tightened to collapse lock ring 2b onto the steel pipe 60.

In another embodiment of the present invention, a structure similar to that shown in FIG. 1 is utilized as the metal coupling means. In this embodiment of the present invention, the coupling as shown in FIG. 1 would be modified as follows. First, the flange 11 as shown on the left side of the coupling would be welded to a central portion of the middle ring 1 at or near the location of the head of the arrow which identifies middle ring 1 in FIG. 1. Such welded flange (unlike the left flange of the coupling shown in the prior art of FIG. 1) would no longer include a grip ring 2a, seal 3a, off-set member 5 nor pressure ring 4 but rather would simply provide a flange having openings therein to allow bolts 40 to pass therethrough and provide a means to allow nuts 41 and 42 to sequentially draw flanges 21 and 31 relatively closer to the welded flange 11. The right side of the coupling would operate in the same manner as the U-Series coupling shown in FIG. 1 with an inner flange 21 which may be tightened by a first set of nuts 41 being utilized to compress gasket member 3b onto an inserted metal pipe in the field. An outer flange 31, which may be tightened with a second set of nuts 42, would be utilized to thereafter independently collapse the lock ring 2b onto the metal pipe. The control means is the provision of the two independent inner and outer flanges (21 and 31, respectively) which are sequentially tightened and moved closer to the welded flange 11 by two independent pairs of nuts (41 and 42, respectively) movable on bolts 40 extending through all three flanges (11, 21 and 31).

A final structure which can be utilized as the control means for the present invention is set forth in U.S. Pat. No. 4,466,640 (Van Houtte), the disclosure of which is incorporated herein by reference thereto. Referring to FIGS. 1 and 2 of Van Houtte, an outer housing or pressure ring 17 is formed over an inner shell (follower) 12. The pressure ring and shell define a pressure tight annular passage 18. In use, a tightening means, in the form of a non-compressible fluid such as oil or grease, is supplied through port 19 under pressure to deform the shell (follower) 12 radially inward relative to the outer pressure ring (middle ring) 17. The radially inward force of the shell compresses gasket 15 and collapses lock ring 28. Obviously, because the force directed to the lock ring and gasket is radial rather than axial and because the gasket and lock ring are not positioned radially on top of one another, even if the lock ring were to completely collapse prior to obtaining an adequate seal, further pressure supplied through port 19 would continue to compress the gasket. If this structure were to be used with the present invention, the second end of the middle ring would be formed with a structure as shown on the right half of FIG. 1 of Van Houtte and all of the Van Houtte components therein shown could thus be utilized as taught by Van Houtte.

DETAILED DESCRIPTION OF THE PREFERRED EMBODIMENTS

Figure 1:
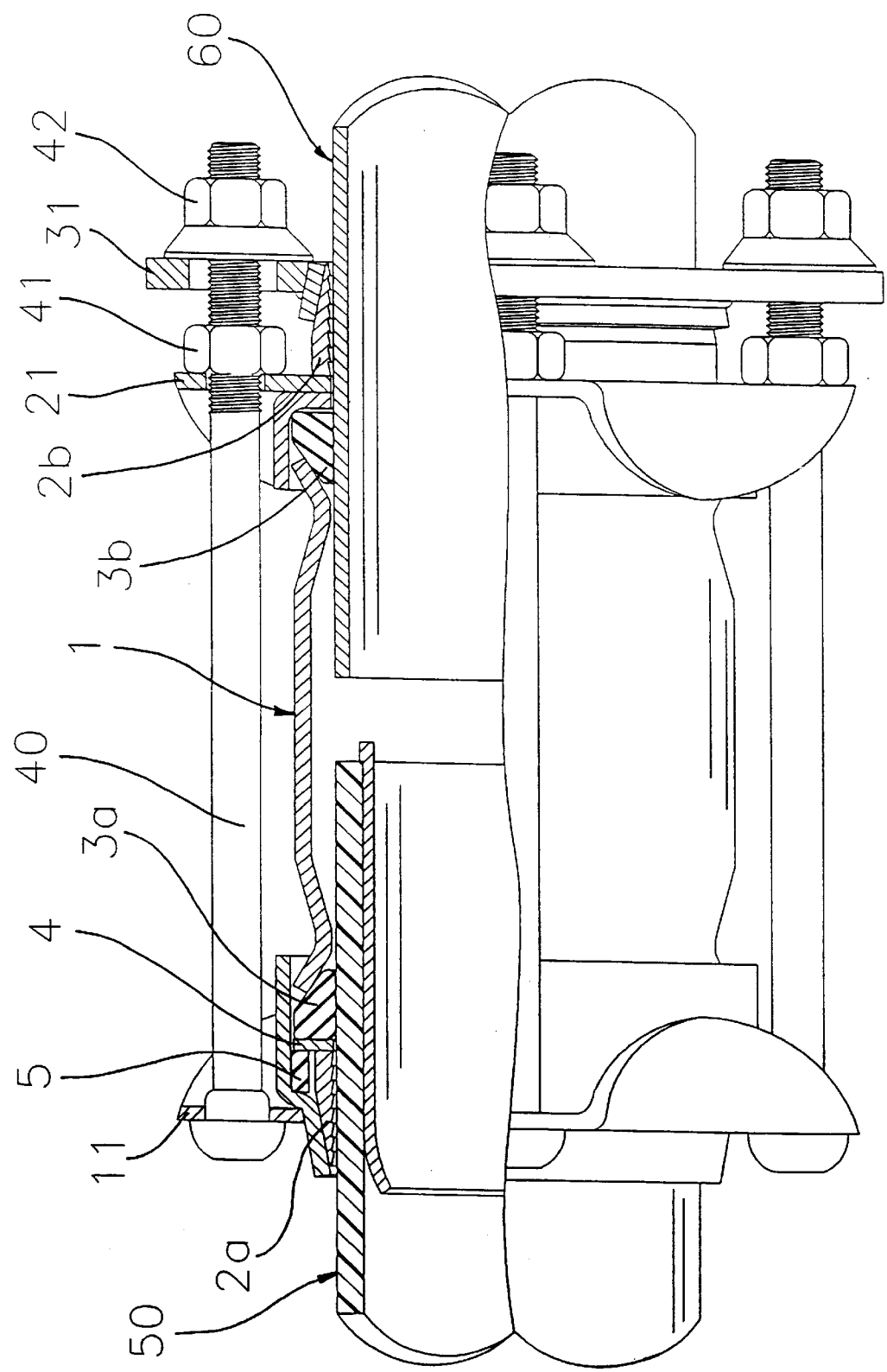
FIG. 1 is a cross sectional view of the prior art coupling known as the Coupling Systems, Inc, U-Series Coupling.

Referring to FIGS. 2, 3a through 3e and FIG. 4, the presently preferred embodiment of the present invention will now be explained. First, the present invention includes a metallic middle ring 100 which includes a first end 130 and a second end 150. The first end 130 of middle ring 100 is adapted to receive and permanently secure of plastic pipe segment 300 by an operation at the factory. A joining means which will be fully described hereinafter imposes an axial restraint on the plastic pipe segment 300. The plastic pipe segment has a first segment end 310 which is inserted into the first end 130 of the middle ring 100. The plastic pipe segment 300 has a second segment end 320 which extends axially out of the coupling for attachment by butt fusion to the plastic pipe end ground. The joining means not only provides an axial restraint on the plastic pipe segment 300 but also provides an adequate gas pressure seal between the plastic pipe segment 300 and 300 and the middle ring 100.

The second end 150 of the middle ring 100 is adapted to receive a metal pipe coupling means which further comprises the following components. First, a follower means 200 is provided which is adapted to move relatively closer to middle ring 100 during installation. A gasket means 160 is provided to produce an adequate gas pressure seal between the second end of the middle ring 150 and a metal pipe 500 when the follower means 200 is moved relatively closer to the middle ring 100.

A locking means which includes a split lock ring 180 having teeth 182 provided on an inner peripheral surface thereof is effective when collapsed to engage the outer surface of the received metal pipe for imposing an axial restraint when the follower means 200 is moved relatively closer to the middle ring.

Figure 2:
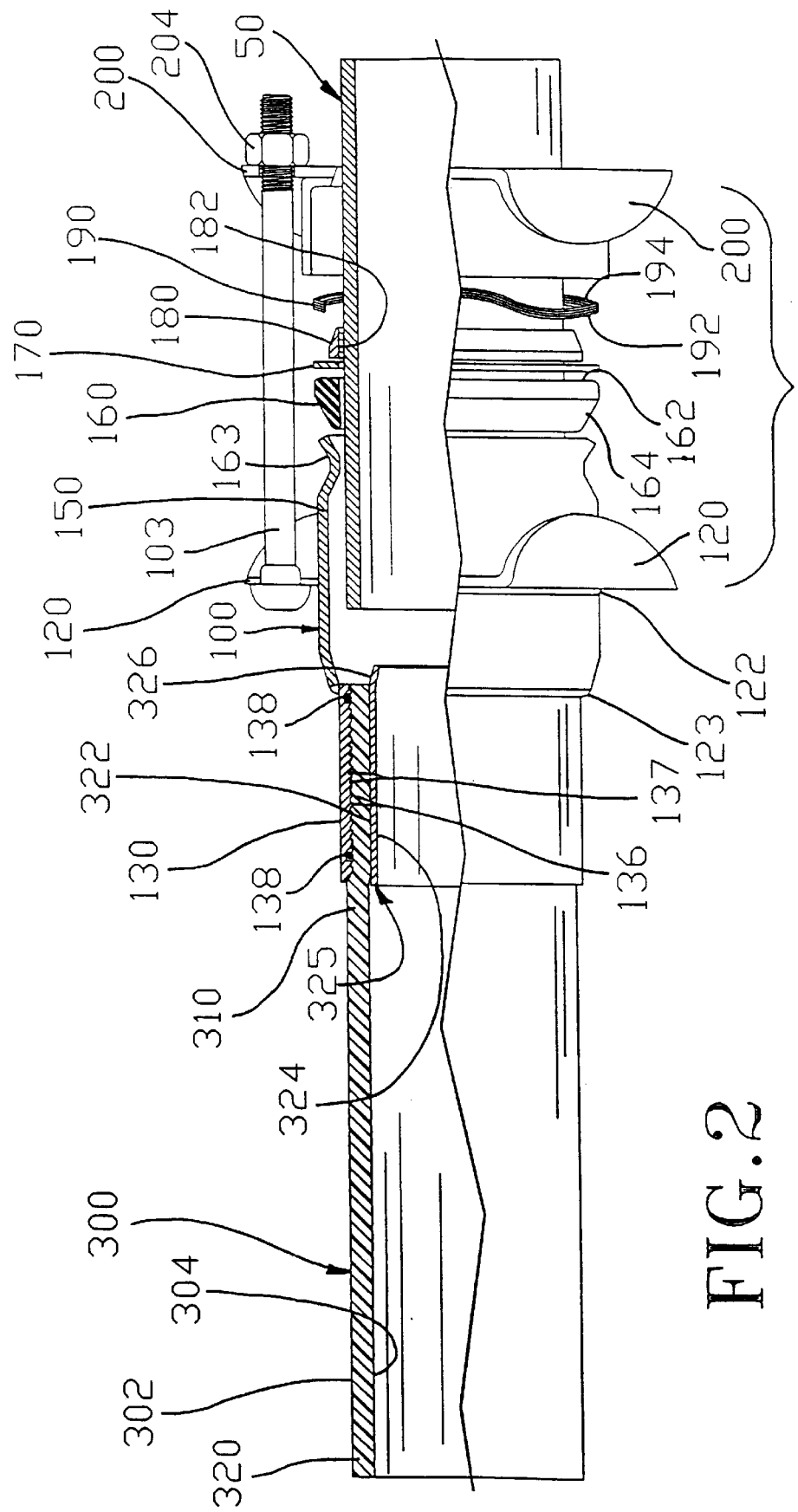
FIG. 2 is an exploded side view, partially cut away to show in cross section, the presently preferred embodiment of the present invention.

A control means, which in FIG. 2 consists of an independent metallic wave spring 190, is provided which is effective during the motion of the follower means 200 to allow the gasket 160 to form an adequate gas pressure seal between the second end 150 of the middle ring 100 and the metal pipe end 500 and to allow the completed collapse of the locking means 180 onto the metal pipe, whereby the collapse of the lock ring 180 does not prevent an adequate seal from being formed even with an anchored metal pipe end.

A tightening means which in FIG. 2 includes a flange 120 welded at 122 to a central portion of middle ring 100 in combination with bolts 103 and nuts 204 is provided to allow motion of the follower means 200 relatively closer to the middle ring 100.

The joining means of the present invention provides a manner to permanently affix first segment end 310 of the plastic pipe segment 300 to the first end 130 of the middle ring 100 by either deforming the first segment end 310 onto a plurality of metal teeth 136 and grooves 137 or by deforming the teeth 136 into the first segment end 310 of the plastic pipe 300.

Preferably, as shown in FIGS. 2, 3*a* through 3*e* and FIG. 4, the joining means further comprises the provision of a plurality of teeth 136 and grooves 137 adjacent to an inner diameter surface 134 of the first end of the middle ring 100. In this case, the outer diameter surface 132 of the first end of the middle ring 100 would have a generally smooth surface. With this arrangement, the outer periphery surface 302 of the first segment end 310 of plastic pipe segment 300 would be sized to engage the inner diameter surface 134 of the first end of the middle ring. The plastic pipe segment 300 also has an inner periphery surface 304 which, as shown in FIG. 2, is defined as a non-engaging surface.

A compression member 325 which has an outer diameter surface 322 and inner diameter surface 324 is utilized to compress and cold form the plastic material at the location of the engaging surface of the first segment end of the plastic pipe segment onto and into said teeth 136 and grooves 137. In this embodiment, which is the preferred embodiment, a forward end 326 of compression member 325 is formed frusto-conically inward towards a central axis 135 of the coupling and pipes to allow for easy insertion into second segment end 320 of plastic pipe segment 300. The compression member 325 is then driven inwardly (to the right in FIG. 2) into its final resting position as shown. The compression member 325 is dimensioned to slide loosely into pipe 300 until it enters a reduced diameter of the plastic pipe located within the first end of the middle ring.

Figure 3A:
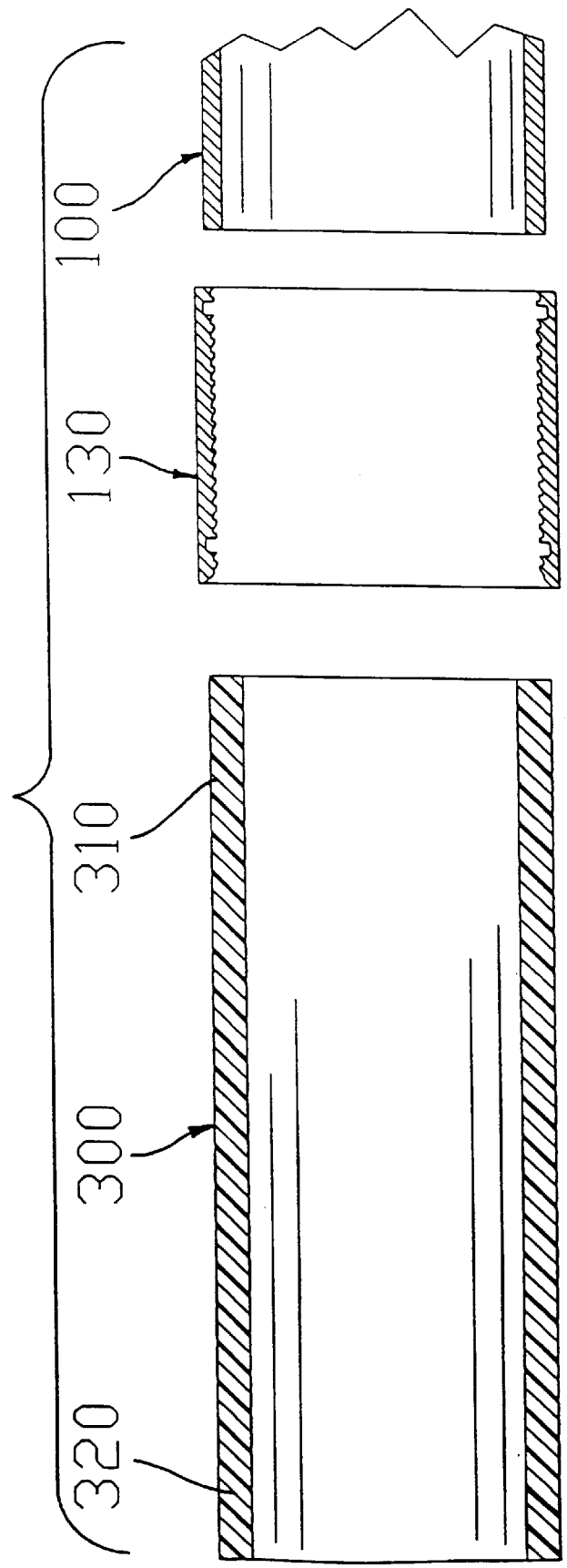
FIGS. 3a through 3e are cross sectional views of the components and the sequence of assembly of the presently preferred joining means of the present invention whereby a length of plastic pipe is factory joined to a first end of a middle ring.
Figure 3B:
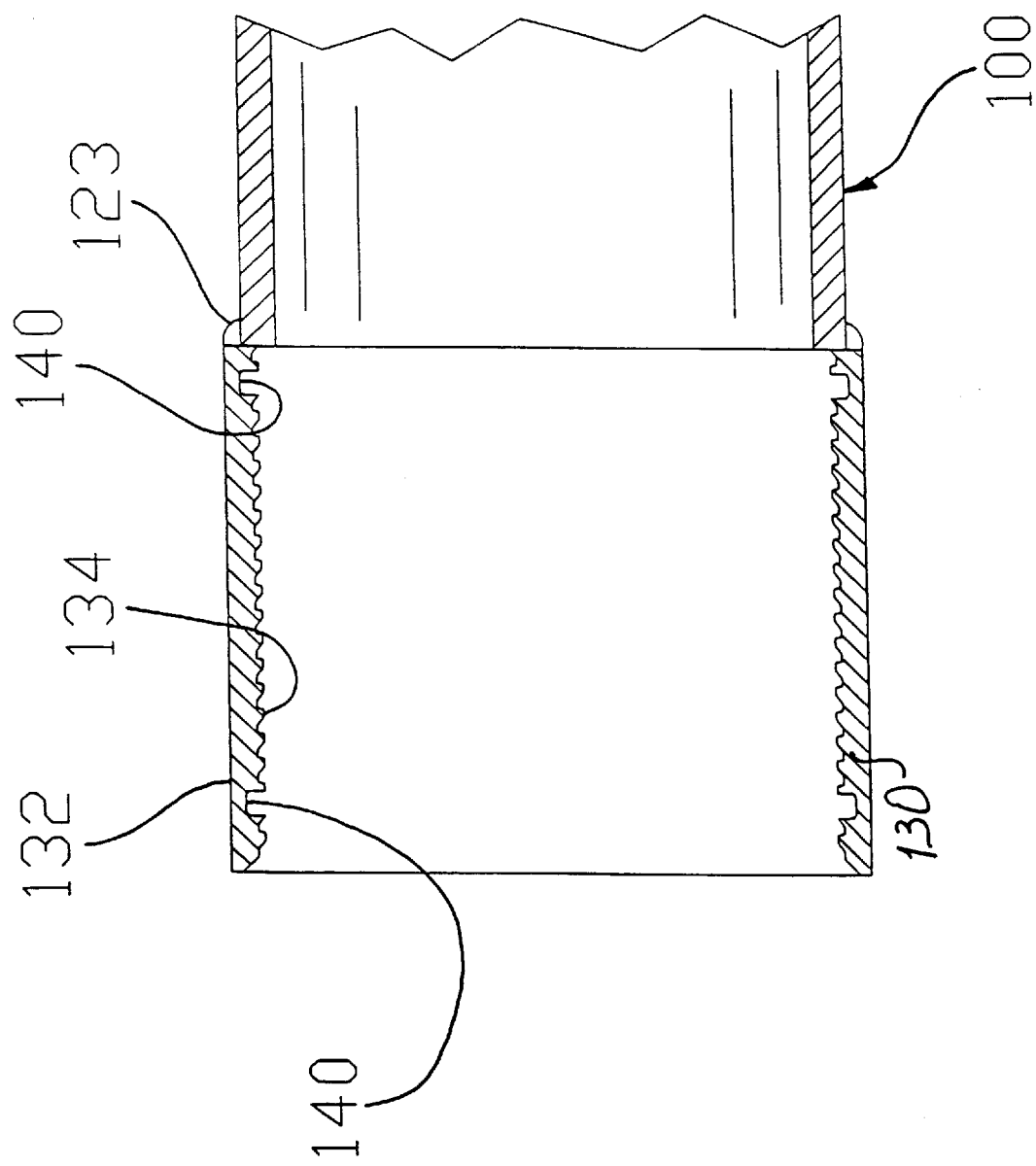
Figure 3C:
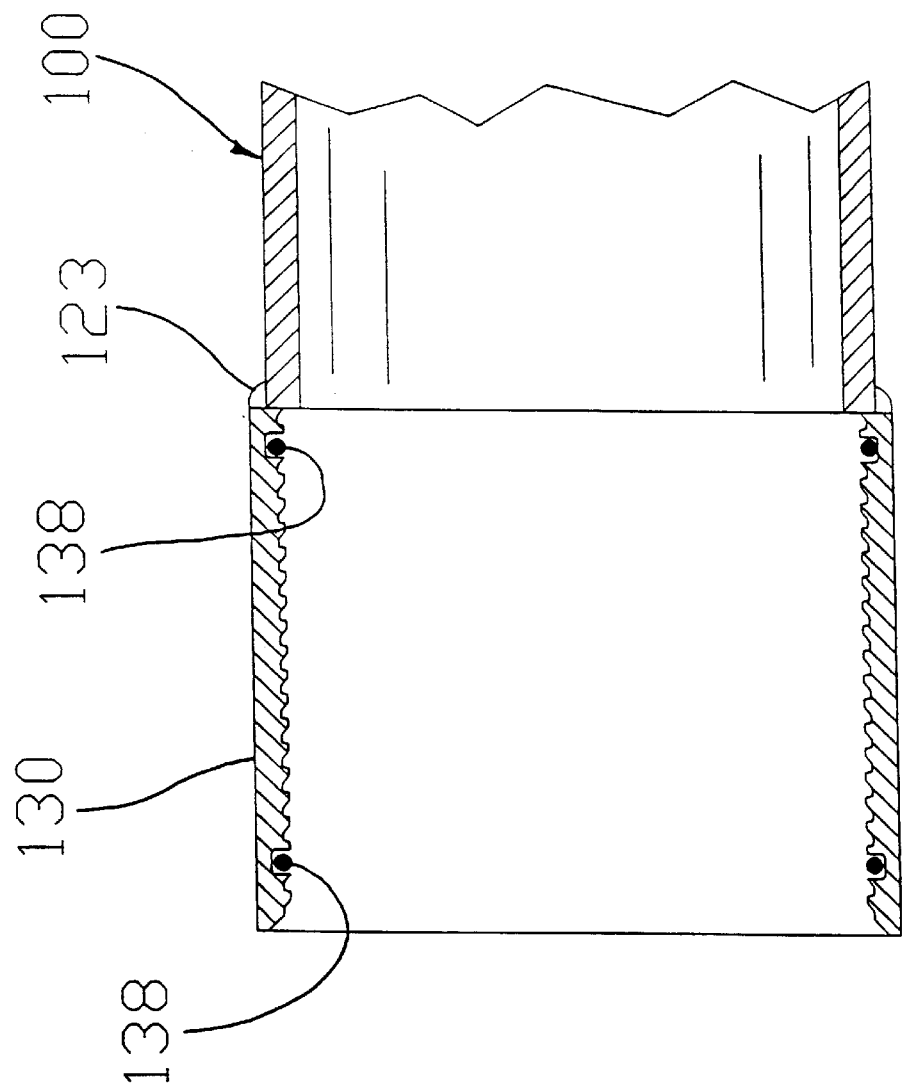

Referring to FIGS. 3*a* through 3*e*, the joining means will be more fully described. As shown in FIG. 3*a*, the first end 130 of middle ring 100 may be initially formed as a separate member. As shown in FIG. 3*b*, the first end 130 may be welded at 123 onto the middle ring 100 thereby forming a first end 130 thereof. The first end portion 130 which includes an outer diameter surface 132 and an inner diameter surface 134 also has two grooves 140 formed in the inner diameter surface 134 for receiving two O-ring seals 138. Although elastomeric O-ring seals 138 are not required by the present invention for the joining means to provide an adequate seal, the provision of a pair of O-ring seals 138 as shown in FIG. 3*c* is preferred for an added measure of safety.

Figure 3D:
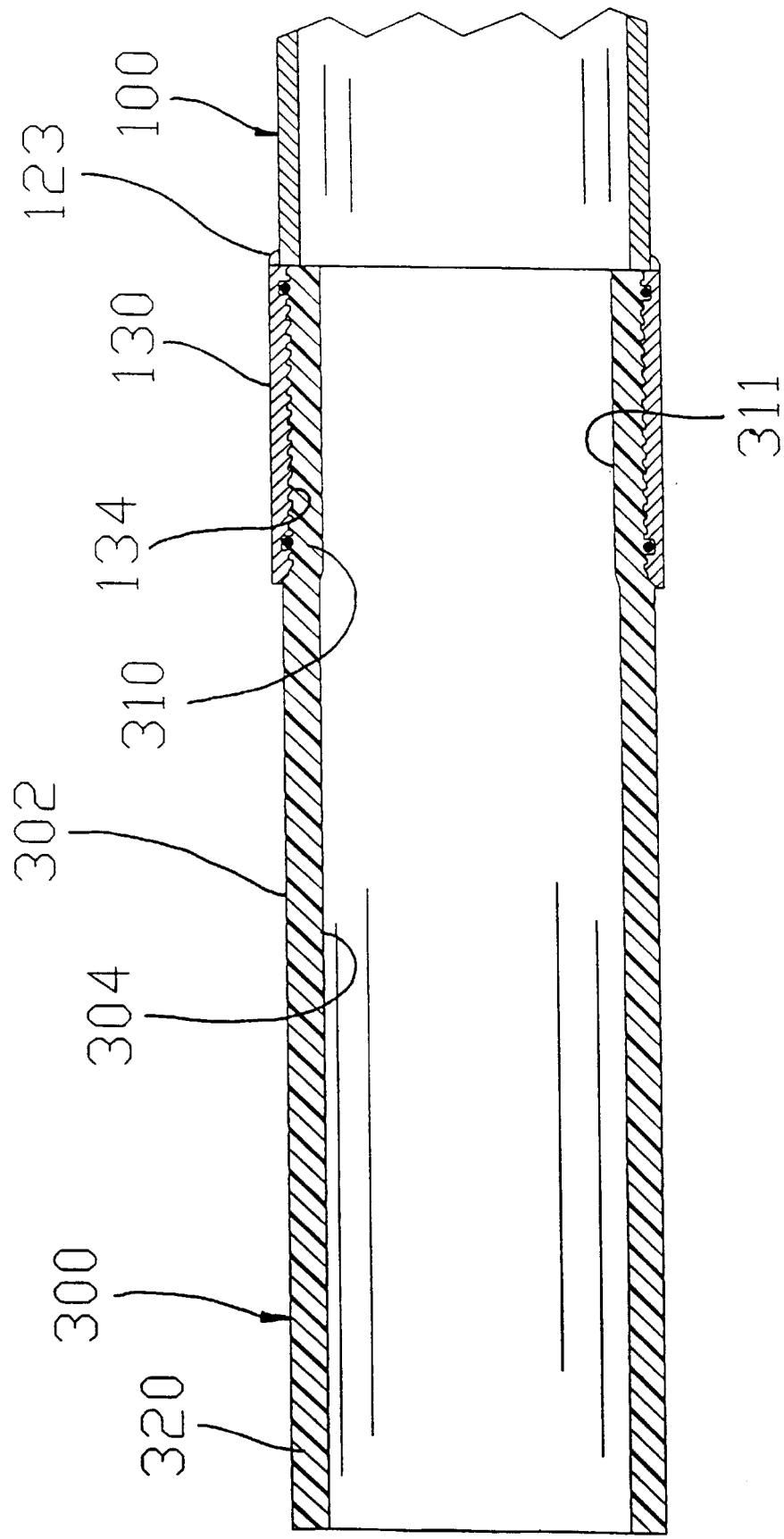

Once the O-ring seals 138 are in place, the first segment end 310 of the plastic pipe segment 300 is inserted into the first end 130 of the middle ring 100 as shown in FIG. 3*d*. As is shown, the inner diameter surface 134 of the first end 130 of the middle ring 100 is dimensioned to be slightly smaller than the outer periphery surface 302 of the length of plastic pipe 300. The insertion of the first segment end 310 of the plastic pipe 300 into the first end 130 of the middle ring 100 causes a reduction in the inner diameter surface 304 of the plastic pipe segment 300 as shown at 311.

Figure 3E:
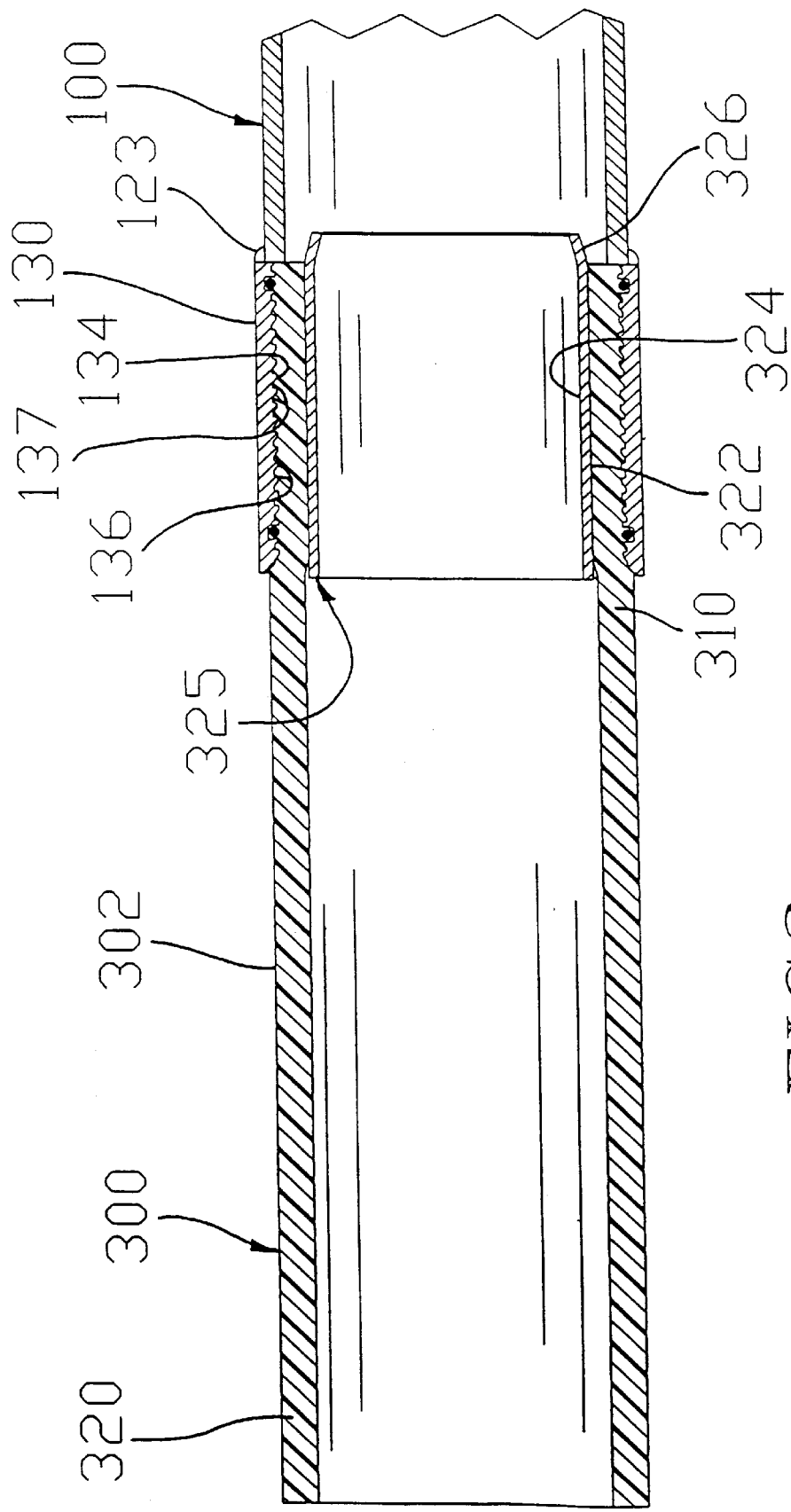

As shown in FIG. 3*e*, as a final step in assembling the joining means of the present invention, the compression member 325 is slid to the right first entering segment end 320 of plastic pipe segment 300 and then is driven into the position shown in 3*e*. During this force-fitting operation, the plastic pipe 300 is forced radially outward. This causes the outer periphery surface 302 of pipe segment 300 to cold flow into the teeth 136 and grooves 137 provided on the inner diameter surface 134 of the first end 130 of the middle ring 100. This results in an adequate gas tight permanent connection which is stronger than that of the plastic material itself. Under axial pipe load, plastic pipe will permanently deform outside the joint area without pulling from the joint or without the joint leaking.

It is noted that although the first end 130 of the middle ring 100 is shown as a separate component which is thereafter welded to the middle ring, it is obvious that the first end 130 could be formed as a single piece, thus eliminating the welded connection.

Figure 4:
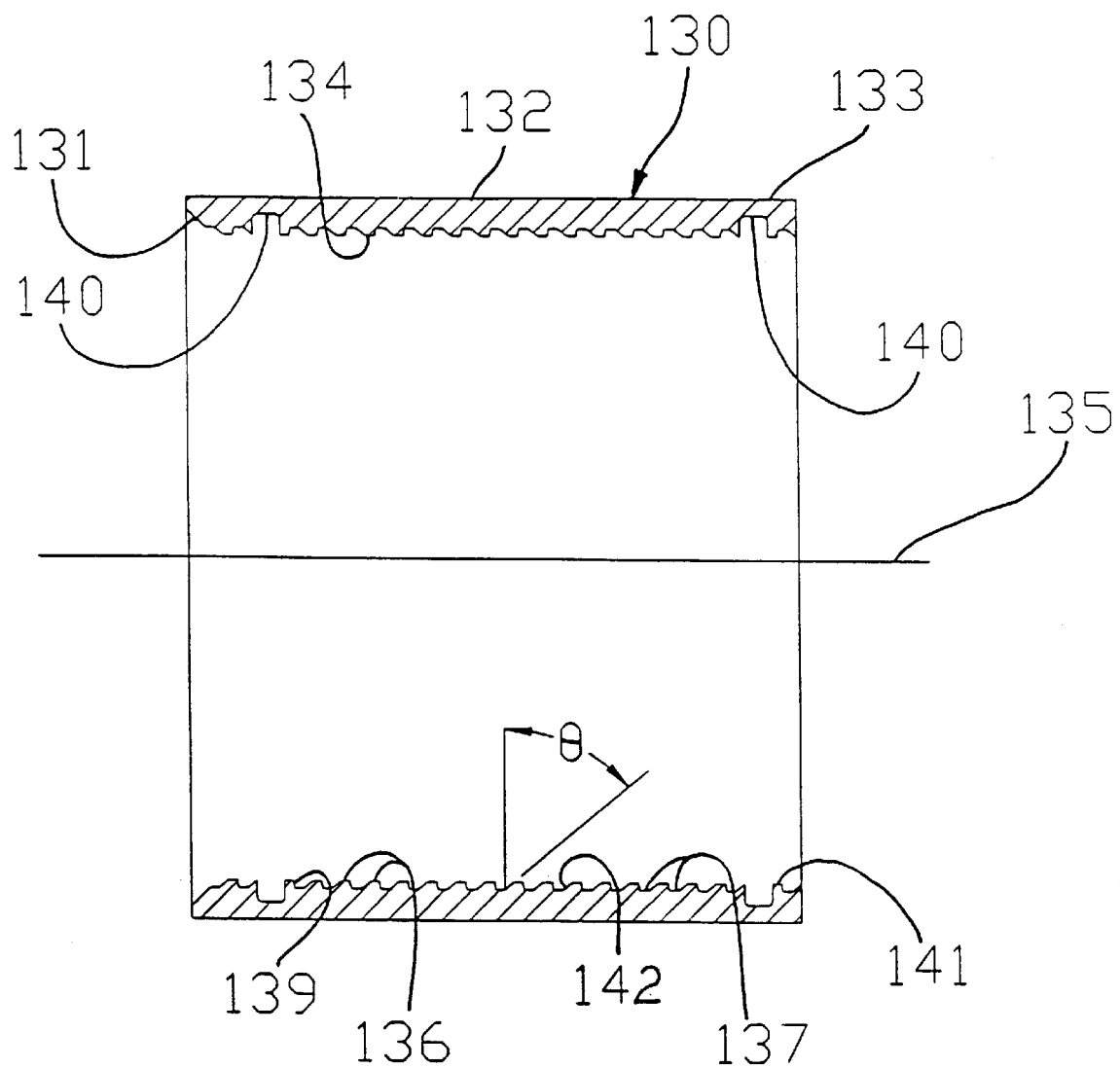
FIG. 4 shows the presently preferred embodiment of the first end of the middle ring of the present invention having a plurality of teeth and grooves adjacent the inner diameter surface of said first end of the middle ring.

Preferably, the first end 130 of the middle ring 100 includes a plurality of teeth 136 and grooves 137 as best shown in FIG. 4. The teeth 136 have an inwardly facing surface 139 which is substantially perpendicular (preferably within 10° of being perpendicular) to the central axis 135 of the pipe coupling. An opposite tooth surface 142 is adapted to be provided at an angle θ relative to the surface 139. Angle θ is preferably about 50°. Preferably, top surfaces 141 of the teeth 136 are flattened off and do not come to a sharp point. This prevents scratching of the surface of the pipe and allows for easier insertion of the first segment end 310 of the plastic pipe segment 300 into the first end 130 of the middle ring 100.

In between adjacent teeth 136, valleys or grooves 137 are present. This series of teeth 136 and grooves 137 allow for easy insertion of the first segment end 310 of pipe segment 300 to be inserted into the first end 130 of the middle ring 100 but after the plastic material of pipe segment 300 is deformed onto the teeth and into the valleys, the teeth configuration greatly resists axial pullout of the pipe 300.

It will be obvious to one skilled in the art that a variety of variations as to the joining means are contemplated. A number of these variations have been discussed above by virtue of the patents incorporated into this application by reference. One particular modification to the joining means which will be obvious to one of ordinary skill in the art is partially shown in FIG. 5.

Figure 5:
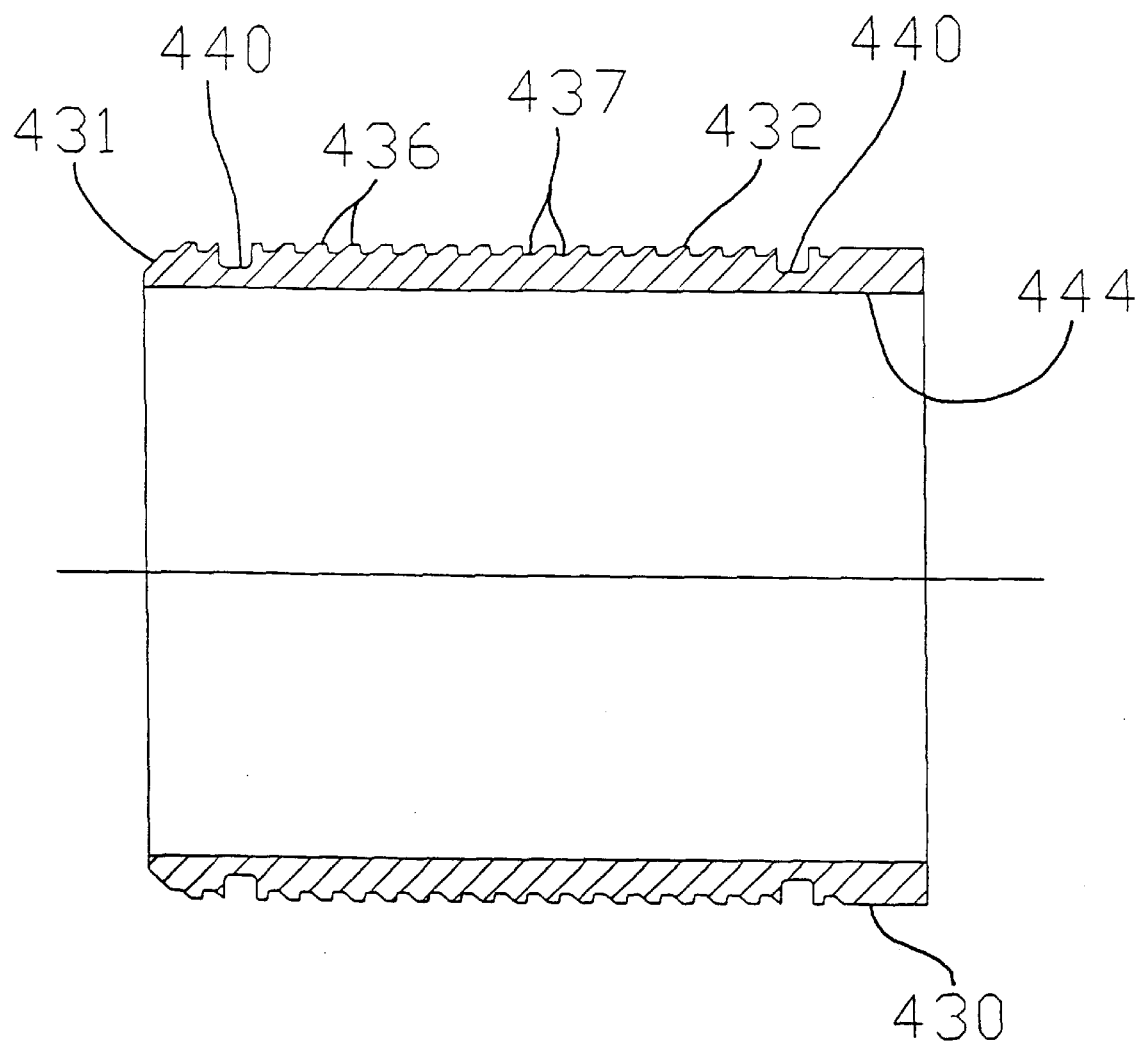
FIG. 5 shows another embodiment of the first end of the middle ring of the present invention having a plurality of teeth and grooves adjacent the outer diameter surface of said first end of the middle ring.

In FIG. 5, rather than providing teeth 136 and grooves 137 on an inner diameter surface 134 of the first end 130 of the middle ring 100, it is contemplated that teeth 436 and grooves 437 could be provided on an outer periphery surface 432 of a first end 430 of the middle ring. With this configuration, obviously the inner periphery surface 304 of pipe segment 300 would be the engaging surface and the outer periphery surface 302 of pipe segment 300 would be the non-engaging surface. In this embodiment, rather than provide a compression member 325 which is adapted to slide inside pipe segment 300, a larger diameter compression member 325' would be provided which would slide on the outer diameter surfaces of the pipe segment 300 on the then non-engaging surface 302. Obviously, end 326' of compression member 325' would be formed frusto-conically outward away from the central axis of the coupling rather than frusto-conically inward as shown at 326' in FIG. 2.

In short, the preferred joining means of the present invention contemplates securing first segment end 310 of plastic pipe segment 300 firmly between two annular metallic members with teeth and grooves being provided on one of such members. It is important, however, to note that it is critical to provide metallic support for both the inner periphery surface 304 and outer periphery surface 302 of first segment end 310 of the plastic pipe. The particular location where the teeth and grooves are provided would be an obvious choice to one skilled in the art and the present invention is intended to cover each of the joining means disclosed herein and in the patents incorporated herein by reference referred to above.

During manufacture, the first end 130 of the middle ring 100 is preferably first machined and is then welded to the remainder of the middle ring 100 at 123. The entire middle ring is then factory coated prior to further assembly since the coating process requires heat which would damage the plastic pipe 300. After coating, the middle ring 100 including the attached first end 130 thereof is placed into a press for plastic pipe insertion. The plastic pipe segment 300 is then inserted into the first end 130 by first placing the plastic pipe end onto beveled ramp portion 131 and then forcefully driving the plastic pipe segment 300 into the first end 130 of the middle ring 100 a sufficient distance to traverse all of the teeth 136 and grooves 137 and the sealing rings 138.

Thereafter, the compression member 325 is driven into the coupling as described above causing the pipe segment surface 302 to cold form into the teeth 136 and grooves 137.

Although the operation of the preferred coupling means portion of the present invention is believed to be adequately disclosed in U.S. Pat. No. 5,069,490 (Halen), a brief description of this structure will follow. As shown in FIG. 2, the second end 150 of the middle ring 100 has a flared end 163 which is adapted to receive a frusto-conical surface of a longitudinal innermost gasket end 164 provided on gasket member 160. The gasket member 160 preferably has a flat back surface on the longitudinal outermost end 162 as shown. A metallic backup ring 170 (in the form of a large flat metal washer) is provided adjacent the back surface 162 of the gasket member 160. Thus, the gasket member 160 has a longitudinal innermost gasket end 164 adapted to be received by the flared end 163 of the middle ring 100 and the gasket member 160 has a longitudinally outermost end 162 which is flat. An independent metal annular wave spring 190 is positioned longitudinally outward of the backup ring 170. The wave spring 190 has a longitudinal innermost surface 192 and outermost surface 194.

The locking means comprises a split ring 180 having gripping teeth 182 positioned on a circumferential inside surface thereof. The teeth are adapted to engage a metal pipe end when the gripping member is collapsed. The follower member 200 is positioned longitudinally outward of the wave spring 190 and gripping member or lock ring 180, said follower having a longitudinal outer flange portion having a substantially flat inner bearing surface. The tightening means described above are utilized for providing an axially inward force on the follower member 200 to urge the follower member relatively closer to the middle ring whereby, as force is applied, inward motion of the follower member 200 initially causes force to be transferred from the follower member 200 through the wave spring 190 to the gasket 160, thereby causing partial gasket 160 compression and thereafter causes the wave spring 190 to compress in only a longitudinal direction and causes the backup ring 170 to contact and collapse the gripping member 180 and said gripping teeth 182 to engage the metal pipe end.

It is to be understood that the present invention contemplates the provision of a joining means to permanently connect a length of plastic pipe to a middle ring at the factory under precisely controlled conditions. The purpose of utilizing such a factory made joint is to eliminate the risk of installer error which may be caused by the installer not properly utilizing any of the number of known mechanical couplings designed for field connections to plastic pipe.

The invention also contemplates, however, that the opposite end (the second end) of the middle ring will be adapted to utilize a mechanical coupling of known type. A variety of couplings have been disclosed herein which would serve this purpose.

The benefits of the present invention are enormous. First, with respect to known transition fittings, the field installation requires not only a heat fusion of the second segment end of the segment plastic pipe to the plastic pipeline in the field but further requires an enormously expensive welding operation by highly skilled welders of the metal end of the known transition fitting to the metal pipeline in the field.

With the present invention, however, an installer would simply stab the metal coupling means onto the metal pipeline in the field, cut either the plastic pipe segment provided or the plastic pipeline in the field so that the plastic ends join together, heat fuse together the two now adjoining plastic ends by known field techniques which are safe and inexpensive and, thereafter, simply tighten the nuts (or otherwise activate the tightening means) to provide a grip and seal onto the metal pipe end. This procedure greatly streamlines the in field process of joining non-metallic pipe ends to metallic pipe ends, thereby resulting in cost savings in installation as well as providing a safe and reliable pipeline transition joint which can be installed by relatively unskilled laborers in the field.

While I have shown and described the presently preferred embodiments of my invention, the invention is not limited thereto and may be otherwise variously practiced within the scope of the following claims:

I claim:

1. A preformed transition pipe coupling suitable for joining a generally cylindrical non-metallic pipe end and a generally cylindrical metal pipe end comprising:
   a) a middle ring having a first end and a second end;
   b) a non-metallic pipe segment, said nonmetallic pipe segment having a first segment end inserted into and permanently and non-separably affixed to said first end of said middle ring by a joining means which imposes an axial restraint on said non-metallic pipe segment, said non-metallic pipe segment having a second segment end extending axially out of the coupling (for attachment to said non-metallic pipe end), said joining means also providing an adequate gas pressure seal between the non-metallic pipe segment and the middle ring;
   c) metal pipe coupling means for coupling said metal pipe end to said second end of said middle ring, said metal pipe coupling means further comprising:
      i) follower means adapted to move relative to said middle ring during installation;
      ii) gasket means to provide an adequate gas pressure seal between said second end of said middle ring and said metal pipe end when said follower is moved relative to said middle ring;
      iii) locking means effective when collapsed to grip said metal pipe end for imposing an axial restraint thereon when said follower means is moved relative to said middle ring;
      iv) control means effective during said motion of the follower to provide an adequate gas pressure seal between said second end of said middle ring and said metal pipe end and to provide a completed collapse of said locking means onto the metal pipe end whereby the collapse of the lock ring does not prevent an adequate seal from being formed on the metal pipe end; and
      v) tightening means to move said follower relative to said middle ring.

2. A preformed transition pipe coupling according to claim 1 wherein said joining means further comprises a plurality of metal teeth and grooves.

3. A preformed transition pipe coupling according to claim 2 wherein said joining means further comprises elastomeric sealing means located between said first end of said middle ring and said first segment end of said non-metallic pipe segment to aid in creating an adequate pressure seal between said first end of said middle ring and said first segment.

4. A preformed transition pipe coupling according to claim 3 wherein said elastomeric sealing means further comprises at least one O-ring groove provided in said first end of said middle ring and at least one O-ring member with said at least one O-ring member positioned in said at least one O-ring groove.

5. A preformed transition pipe coupling according to claim 1 wherein said control means provides an initial pre-determined clearance between the gasket means and the locking means whereby initial tightening of said tightening means will cause deformation of said gasket means to create an adequate pressure seal prior to completed collapse of said locking means.

6. A preformed transition pipe coupling according to claim 1 wherein said control means provides an initial pre-determined clearance between the follower means and the locking means whereby initial tightening of said tightening means will cause deformation of said gasket means to create an adequate pressure gas seal prior to completed collapse of said locking means.

7. A preformed transition pipe coupling according to claim 1 wherein:
   a) said second end of said middle ring has a flared end, said gasket means further comprises an annular gasket member positioned within said second end of said middle ring;
   b) said gasket member having a longitudinal innermost gasket end adapted to be received by the flared end of said middle ring and said gasket member having a longitudinal outermost end;
   c) an annular backup ring positioned longitudinally outwardly of said gasket member;
   d) control means effective during said motion of the follower to provide an adequate gas pressure seal between said second end of said middle ring and said metal pipe end and to provide a completed collapse of said locking means onto the metal pipe end whereby the collapse of the lock ring does not prevent an adequate seal from being formed on the metal pipe end, said control mean comprising an independent metal annular wave spring positioned longitudinally outwardly of said backup ring, said wave spring having a longitudinal innermost surface and a longitudinal outermost surface; and
   e) said locking means comprising a collapsible split ring annular gripping member positioned longitudinally outwardly of said backup ring, said gripping member having gripping teeth on a circumferential inside surface thereof, said teeth adapted to engage said metal pipe end when said gripping member is collapsed
   f) wherein said follower means includes a follower member which is positioned longitudinally outwardly of said wave spring and gripping member, said follower member having a longitudinal outer flange portion having a substantially flat inner bearing surface
   wherein said tightening means engages said follower member for providing inward force on said follower member to urge said follower member relatively closer to said middle ring whereby, as force is applied, inward motion of the follower member initially causes force to be transferred from the follower members through said wave spring to the gasket thereby causing partial gasket compression, thereafter causes said wave spring to compress in only a longitudinal direction and causes said backup ring to contact and collapse said gripping member and said gripping teeth to engage said metal pipe end.

8. A preformed transition pipe coupling suitable for joining a generally cylindrical non-metallic pipe end and a generally cylindrical metal pipe end comprising:
   a) a metal middle ring having a first end and a second end;
   b) a non-metallic pipe segment, said non-metallic pipe segment having a first segment end inserted into and permanently affixed to said first end of said middle ring by a joining means which imposes an axial restraint on said non-metallic pipe segment, said non-metallic pipe segment having a second segment end extending axially out of the coupling for attachment to said non-metallic pipe end, said joining means also providing an adequate gas pressure seal between the non-metallic pipe segment and the middle ring;

c) metal pipe coupling means for coupling said metal pipe end to said second end of said middle ring, said metal pipe coupling means further comprising:
   i) follower means adapted to move relative to said middle ring during installation;
   ii) gasket means to provide an adequate gas pressure seal between said second end of said middle ring and said metal pipe end when said follower is moved relative to said middle ring;
   iii) locking means effective when collapsed to grip said metal pipe end for imposing an axial restraint thereon when said follower means is moved relative to said middle ring;
   iv) control means effective during said motion of the follower to provide an adequate gas pressure seal between said second end of said middle ring and said metal pipe end and to provide a completed collapse of said locking means onto the metal pipe end whereby the collapse of the lock ring does not prevent an adequate seal from being formed on the metal pipe end; and
   v) tightening means to move said follower relative to said middle ring, wherein said joining means further comprises the provision of a plurality of teeth and grooves adjacent an inner diameter surface of said first end of the middle ring and wherein said first segment end has an engaging surface thereon defined as an outer periphery surface of said first segment end and further has a non-engaging surface defined as an inner periphery surface of said first segment end, said engaging surface placed in engagement with said teeth and grooves, with a compression member sized and adapted to slide adjacent to contact the non-engaging surface to compress and to cold form the first segment end of the non-metallic pipe segment onto and into said teeth and grooves.

9. A preformed transition pipe coupling according to claim 8 wherein:
   a) said second end of said middle ring has a flared end, said gasket means further comprises an annular gasket member positioned within said second end of said middle ring;
   b) said gasket member having a longitudinal innermost gasket end adapted to be received by the flared end of said middle ring and said gasket member having a longitudinal outermost end, c) an annular backup ring positioned longitudinally outwardly of said gasket member;
   d) an independent metal annular wave spring positioned longitudinally outwardly of said backup ring, said wave spring having a longitudinal innermost surface and a longitudinal outermost surface;
   e) said locking means comprising a collapsible split ring annular gripping member positioned longitudinally outwardly of said backup ring, said gripping member having gripping teeth on a circumferential inside surface thereof, said teeth adapted to engage said metal pipe end when said gripping member is collapsed;
   f) a follower member positioned longitudinally outwardly of said wave spring and gripping member, said follower member having a longitudinal outer flange portion having a substantially flat inner bearing surface; and
   g) tightening means engaging said follower member for providing inward force on said follower member to urge said follower member relatively closer to said middle ring whereby, as force is applied, inward motion of the follower member initially causes force to be transferred from the follower member through said wave spring to the gasket thereby causing partial gasket compression, thereafter causes said wave spring to compress in only a longitudinal direction and causes said backup ring to contact and collapse said gripping member and said gripping teeth to engage said metal pipe end.

10. A preformed transition pipe coupling suitable for joining a generally cylindrical non-metallic pipe end and a generally cylindrical metal pipe end comprising:
   a) a metal middle ring having a first end and a second end;
   b) a non-metallic pipe segment, said non-metallic pipe segment having a first segment end inserted into and permanently affixed to said first end of said middle ring at the factory by a joining means which imposes an axial restraint on said nonmetallic pipe segment, said non-metallic pipe segment having a second segment end extending axially out of the coupling for attachment to said non-metallic pipe end, said joining means also providing an adequate gas pressure seal between the non-metallic pipe segment and the middle ring;
   c) metal pipe coupling means for coupling said metal pipe end to said second end of said middle ring, said metal pipe coupling means further comprising:
      i) follower means adapted to move relative to said middle ring during installation;
      ii) gasket means to provide an adequate gas pressure seal between said second end of said middle ring and said metal pipe end when said follower is moved relative to said middle ring;
      iii) locking means effective when collapsed to grip said metal pipe end for imposing an axial restraint thereon when said follower means is moved relative to said middle ring;
      iv) control means effective during said motion of the follower to provide an adequate gas pressure seal between said second end of said middle ring and said metal pipe end and to provide a completed collapse of said locking means onto the metal pipe end whereby the collapse of the lock ring does not prevent an adequate seal from being formed on the metal pipe end; and
      v) tightening means to move said follower relative to said middle ring, wherein said joining means further comprises the provision of a plurality of teeth and grooves adjacent the outer diameter surface of said first end of the middle ring and wherein said first segment end of said non-metallic pipe segment has an engaging surface thereon defined as the inner periphery surface and further, has a non-engaging surface defined as the outer periphery surface, said engaging surface placed in engagement with said teeth and grooves with a compression member sized and adapted to slide adjacent to contact the non-engaging surface to compress and to cold form the first segment end of the non-metallic pipe segment onto and into said teeth and grooves.

11. A preformed transition pipe coupling suitable for joining a generally cylindrical non-metallic pipe end and a generally cylindrical metal pipe end comprising:
   a) a metal middle ring having a first end and a second end;
   b) a non-metallic pipe segment, said non-metallic pipe segment having a first segment end inserted into and permanently affixed to said first end of said middle ring by a joining means which imposes an axial restraint on said non-metallic pipe segment, said non-metallic pipe segment having a second segment end extending axially out of the coupling for attachment to said non-metallic pipe end, said joining means also providing an adequate gas pressure seal between the non-metallic pipe segment and the middle ring;

c) metal pipe coupling means for coupling said metal pipe end to said second end of said middle ring, said metal pipe coupling means further comprising:
  i) follower means adapted to move relative to said middle ring during installation;
  ii) gasket means to provide an adequate gas pressure seal between said second end of said middle ring and said metal pipe end when said follower is moved relative to said middle ring;
  iii) locking means effective when collapsed to grip said metal pine end for imposing an axial restraint thereon when said follower means is moved relative to said middle ring;
  iv) control means effective during said motion of the follower to provide an adequate gas pressure seal between said second end of said middle ring and said metal pipe end and to provide a completed collapse of said locking means onto the metal pipe end whereby the collapse of the lock ring does not prevent an adequate seal from being formed on the metal pipe end; and
  v) tightening means to move said follower relative to said middle ring, wherein said joining means further comprises the provision of a plurality of teeth and grooves on an outer peripheral surface of a compression member which is inserted inside the first segment end of the non-metallic pipe segment from the second end of the middle ring to engage and secure the first segment end of said non-metallic pipe segment, and wherein said compression member includes a flange to prevent retraction of the compression member from the first end of the middle ring.

* * * * *

UNITED STATES PATENT AND TRADEMARK OFFICE
CERTIFICATE OF CORRECTION

PATENT NO. : 5,842,726

DATED : December 1, 1998

INVENTOR(S) : Halen, Jr.

It is certified that error appears in the above-identified patent and that said Letters Patent is hereby corrected as shown below:

Please add omitted Fig. 5b as follows:

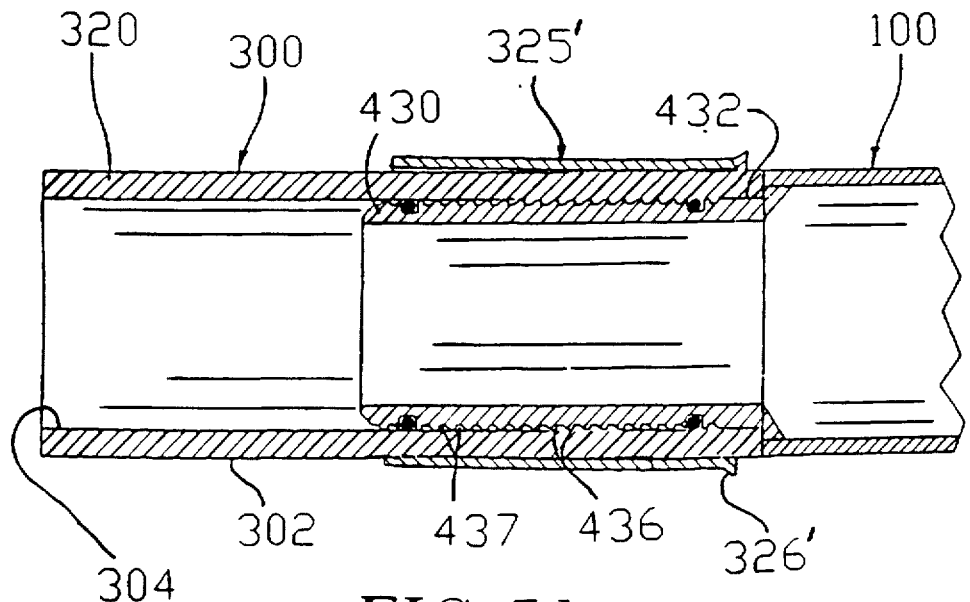

FIG. 5b

UNITED STATES PATENT AND TRADEMARK OFFICE
CERTIFICATE OF CORRECTION

PATENT NO. : 5,842,726

DATED : December 1, 1998

INVENTOR(S) : Halen, Jr.

It is certified that error appears in the above-identified patent and that said Letters Patent is hereby corrected as shown below:

Column 3, line 11, please delete "length";

Column 5, line 25, after "end of the" please insert --middle ring would be formed to have the shape and configuration of body 22 as shown in Figure 1 of Haluch.--;

Column 6, line 62, replace "ring." with --ring;-- and add the following paragraph:

--Fig. 5b is a cross-sectional view of an embodiment of the present invention with the compression member placed on the outer surface of the pipe.--;

Column 7, line 4, after "secure" please delete --of--;

Column 7, line 12, before "ground" please insert --in the--;

Column 7, line 15, please replace "300 and 300" with --300--;

Column 8, line 11, after "plastic pipe" please insert --segment--;

Column 8, lines 31-32, please replace "length of plastic pipe 300"; with --plastic pipe segment 300--;

Column 8, line 38, after "first entering" please insert --second--;

Column 9, line 20, after "configuration," please insert --as shown in Figure 5b,--;

Column 9, line 31, please delete "at 326' in" and replace with --at 326 in--;

Column 10, line 3, after "block surface" please insert --provided--;

Column 10, line 50, please rewrite "segment plastic pipe" to read --plastic pipe segment--;

UNITED STATES PATENT AND TRADEMARK OFFICE
CERTIFICATE OF CORRECTION

PATENT NO.   : 5,842,726

DATED        : December 1, 1998

INVENTOR(S)  : Halen, Jr.

It is certified that error appears in the above-identified patent and that said Letters Patent is hereby corrected as shown below:

Column 11, lines 16-17 (Claim 1, lines 11-12), please replace "(for attachment to said non-metallic pipe end)," with --for attachment to said non-metallic pipe end,--;

Column 12, line 25 (Claim 7, line 20), please replace "control mean" with --control means--; and Column 15, line 19 (Claim 11, line 25), please replace "metal pine end" with --metal pipe end--.

Signed and Sealed this

Fifteenth Day of June, 1999

Attest:

Q. TODD DICKINSON

*Attesting Officer*          *Acting Commissioner of Patents and Trademarks*